(12) United States Patent
Blankespoor et al.

(10) Patent No.: US 9,259,838 B1
(45) Date of Patent: Feb. 16, 2016

(54) SYSTEMS AND METHODS FOR GROUND PLANE ESTIMATION

(71) Applicant: Google Inc., Mountain View, CA (US)

(72) Inventors: Kevin Blankespoor, Mountain View, CA (US); Gabriel Nelson, Mountain View, CA (US); Neil Neville, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/339,860

(22) Filed: Jul. 24, 2014

(51) Int. Cl.
*G01C 22/00* (2006.01)
*G05D 1/00* (2006.01)
*B25J 9/00* (2006.01)
*B25J 9/16* (2006.01)

(52) U.S. Cl.
CPC .............. *B25J 9/0006* (2013.01); *B25J 9/1697* (2013.01)

(58) Field of Classification Search
CPC .............................. B25J 9/0006; B25J 9/1697
USPC ............................................................ 701/26
See application file for complete search history.

(56) References Cited

U.S. PATENT DOCUMENTS

| | | | |
|---|---|---|---|
| 5,357,433 A | 10/1994 | Takenaka | |
| 5,432,417 A | 7/1995 | Takenaka | |
| 7,339,340 B2 | 3/2008 | Summer | |
| 7,953,526 B2 * | 5/2011 | Durkos ................ | G05D 1/0246 340/286.02 |
| 8,160,747 B1 * | 4/2012 | Blackwell ................ | B25J 9/162 700/245 |
| 8,170,738 B2 * | 5/2012 | Urushidani .......... | G05D 1/0242 701/23 |
| 8,442,661 B1 * | 5/2013 | Blackwell .............. | B25J 9/1689 700/245 |
| 8,630,763 B2 | 1/2014 | Goulding | |
| 8,852,292 B2 * | 10/2014 | Ragnarsdottir ........... | A61F 2/68 623/24 |
| 9,014,848 B2 * | 4/2015 | Farlow ................... | B25J 11/009 700/245 |
| 9,020,637 B2 * | 4/2015 | Schnittman .......... | G05D 1/0219 382/106 |
| 2005/0126833 A1 * | 6/2005 | Takenaka ............... | B25J 13/088 180/8.1 |
| 2006/0293808 A1 * | 12/2006 | Qian ........................ | B25J 5/007 701/23 |
| 2008/0154457 A1 * | 6/2008 | Yu ......................... | G05D 1/0219 701/26 |
| 2008/0215185 A1 * | 9/2008 | Jacobsen ................. | F41H 11/16 700/259 |
| 2009/0228166 A1 * | 9/2009 | Durkos ................ | G05D 1/0246 701/26 |
| 2011/0046780 A1 * | 2/2011 | Anderson ............ | G05D 1/0276 700/248 |
| 2011/0166763 A1 * | 7/2011 | Choi ..................... | G05D 1/0272 701/82 |
| 2011/0288684 A1 * | 11/2011 | Farlow .................... | B25J 11/009 700/264 |
| 2011/0313568 A1 * | 12/2011 | Blackwell ................ | B25J 5/007 700/245 |
| 2012/0155775 A1 * | 6/2012 | Ahn ....................... | G06T 7/0042 382/195 |
| 2012/0173070 A1 * | 7/2012 | Schnittman .......... | G05D 1/0227 701/26 |
| 2012/0197464 A1 * | 8/2012 | Wang ..................... | B25J 9/1689 701/2 |
| 2013/0079929 A1 | 3/2013 | Lim | |
| 2013/0131908 A1 * | 5/2013 | Trepagnier ............ | B60W 30/00 701/23 |

\* cited by examiner

*Primary Examiner* — Mary Cheung
*Assistant Examiner* — Atul Trivedi
(74) *Attorney, Agent, or Firm* — McDonnell Boehnen Hulbert & Berghoff LLP

(57) ABSTRACT

Example systems and methods for estimating a ground plane are provided. An example method may include determining an orientation of a body of a robotic device with respect to a gravity aligned reference frame. The method may also include determining the location of one or more contact points between the robotic device and a ground surface. The method may also include determining a ground plane estimation of the ground surface based on the determined orientation of the robotic device with respect to the gravity aligned reference frame and the determined locations of the one or more contact points. The method may also include determining a distance between the body of the robotic device and the determined ground plane estimation. The method may also include providing instructions to adjust a position and/or orientation of the robotic device based on the determined distance and the determined ground plane estimation.

21 Claims, 6 Drawing Sheets

SYSTEMS AND METHODS FOR GROUND PLANE ESTIMATION

GOVERNMENT RIGHTS

This invention was made with U.S. Government support under Contract No. HR0011-10-C-0025. The Government may have certain rights with regard to the invention.

BACKGROUND

Unless otherwise indicated herein, the materials described in this section are not prior art to the claims in this application and are not admitted to be prior art by inclusion in this section.

Robotic devices may be used for many applications, and may operate in a variety of environments. Such robotic devices may need to operate in environments with a sloped ground, an environment with rocky terrain, or various other uneven landscapes. In such environments, the robotic device may need to know the slope of the ground to maintain balance and to progress forward. Such robotic devices may include systems to estimate a flat-plane approximation of the slope of the ground on which the robotic devices are walking in order to move across such terrains.

SUMMARY

The present application discloses embodiments that relate to ground plane estimation for robotic devices. In one example, the present application describes a method operable by a computing device. The method may include determining an orientation of a body of a robotic device with respect to a gravity aligned reference frame. The method may also include determining the location of one or more contact points between the robotic device and a ground surface. The method may also include determining, by one or more processors of the computing device, a ground plane estimation of the ground surface based on the determined orientation of the robotic device with respect to the gravity aligned reference frame and the determined location of the one or more contact points between the robotic device and the ground surface, wherein the ground plane estimation includes a flat-plane approximation of a shape of the ground surface. The method may also include determining a distance between the body of the robotic device and the determined ground plane estimation. The method may also include providing instructions, by one or more processors, to adjust a position and/or orientation of some part of the robotic device based on the determined distance and the determined ground plane estimation.

In another aspect, the present application discloses a robotic device. The robotic device may include a body, two or more legs extending from the body, at least one processor, and data storage comprising program logic executable by the at least one processor to cause the robotic device to perform functions. The functions may include determining an orientation of the body of the robotic device with respect to a gravity aligned reference frame. The functions may also include determining the location of one or more contact points between the robotic device and a ground surface. The functions may also include determining a ground plane estimation of the ground surface based on the determined orientation of the robotic device with respect to the gravity aligned reference frame and the determined location of the one or more contact points between the robotic device and the ground surface, wherein the ground plane estimation includes a flat-plane approximation of a shape of the ground surface. The functions may also include determining a distance between the body of the robotic device and the determined ground plant estimation. The functions may also include providing instructions to adjust a position of the robotic device based on the determined distance and the determined ground plane estimation.

In yet another aspect, the present application discloses a non-transitory computer-readable storage medium having stored thereon instructions, that when executed by a computing device, cause the computing device to carry out functions. The functions may include determining an orientation of a body of a robotic device with respect to a gravity aligned reference frame. The functions may also include determining the location of one or more contact points between the robotic device and the ground surface. The functions may also include determining a ground plane estimation of the ground surface based on the determined orientation of the robotic device with respect to the gravity aligned reference frame and the determined location of the one or more contact points between the robotic device and the ground surface, wherein the ground plane estimation includes a flat-plane approximation of a shape of the ground surface. The functions may also include determining a distance between the body of the robotic device and the determined ground plane estimation. The functions may also include providing instructions to adjust a position of the robotic device based on the determined distance and the determined ground plane estimation.

These as well as other aspects, advantages, and alternatives, will become apparent to those of ordinary skill in the art by reading the following detailed description, with reference where appropriate to the accompanying figures.

DETAILED DESCRIPTION

Figure 1:
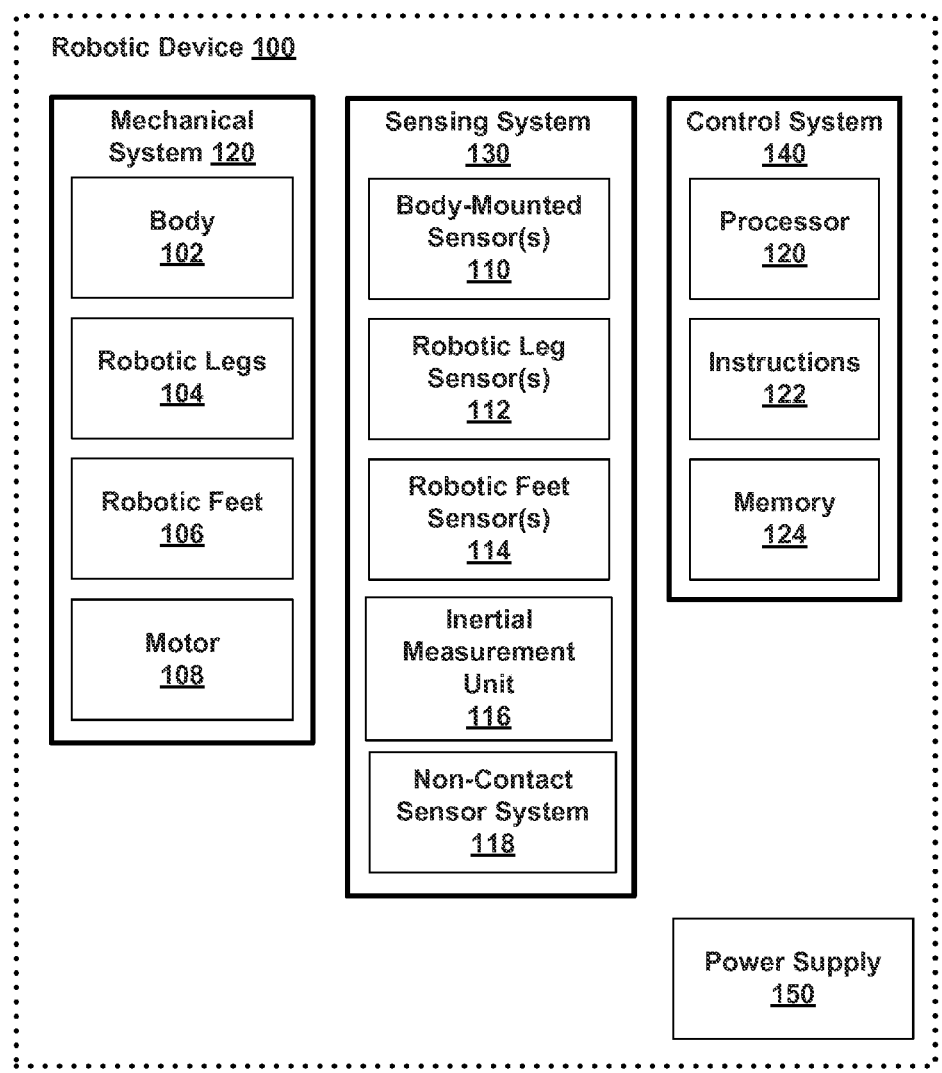
FIG. 1 is a functional block diagram illustrating a robotic device, according to an example embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

In some example operations, a legged robotic device may need to know the slope and location of the ground to maintain balance and forward progress. Such robotic devices may include systems to estimate a flat-plane approximation of the shape of the ground on which the robots are walking in order to locomote on inclined terrain. Inputs to such a ground plane estimation system may include a robot pose and the location of contact points between the robotic device and the ground plane. The robot pose may include a position and orientation of the robotic device. The position of the robot may be relative to points of the robot in contact with the ground or to some other reference. The orientation of the robot is normally estimated using information from an inertial measurement unit (IMU), including accelerators and/or gyroscopes.

Contact points are discrete points in three-dimensional (3D) space that the robotic device, or control system of the robotic device, has computed and determined are likely on the ground. A determination of whether a point is on the ground can be based on sensor information and/or the context of the state of the robot controller. Contact points may be current (a latest value computed) or historical (computed based on a past measurements). In order to use historical points, the robotic device may keep track of how much the robotic device has moved since the historic point location was last contacted. In an example case, point locations are computed using joint positions and a pose of the robotic device. For example, the robotic device may use points on its hands, feet, or knees that are estimated or believed to be on the ground. Contact points also may be virtual points, or generated based on non-contact sensors systems, such as stereo vision or laser range finders looking ahead of the robotic device. Virtual contact points often provide advanced notice about terrain the robotic device has not physically contacted yet. Contact points may also be created based on suggestions by a robotic device operator.

The robotic device may be configured to combine the measurements from the IMU with the discrete contact points to estimate the slope of the ground plane on which the robotic device is operating. The robotic device may be further configured to adjust its position and/or orientation based on the determined ground plane, so as to better position itself for further movement.

It should be understood that the above examples are provided for illustrative purposes, and should not be construed as limiting. As such, the method may additionally or alternatively include other features or include fewer features, without departing from the scope of the invention.

Referring now to the figures, FIG. 1 illustrates a functional block diagram illustrating a robotic device 100, according to an example embodiment. The robotic device 100 may include various subsystems such as a mechanical system 120, a sensing system 130, a control system 140, as well as a power supply 150. The robotic device 100 may include more or fewer subsystems and each subsystem could include multiple elements. Further, each of the subsystems and elements of robotic device 100 could be interconnected. Thus, one or more of the described functions of the robotic device 100 may be divided up into additional functional or physical components, or combined into fewer functional or physical components. In some further examples, additional functional and/or physical components may be added to the examples illustrated by FIG. 1.

The mechanical system 120 may include several components, including a body 102, one or more robotic legs 104, and one or more robotic feet 106 coupled to the one or more robotic legs 104. The mechanical system 120 may additionally include a motor 108, which may be an electric motor powered by electrical power, or may be powered by a number of different energy sources, such as a gas-based fuel or solar power. Additionally, motor 108 may be configured to receive power from power supply 150. The power supply 150 may provide power to various components of robotic device 100 and could represent, for example, a rechargeable lithium-ion or lead-acid battery. In an example embodiment, one or more banks of such batteries could be configured to provide electrical power. Other power supply materials and types are also possible.

The sensing system 130 may determine information about the environment that can be used by control system 140 (e.g., a computing device running motion planning software) to determine a ground plane estimation of the ground surface on which the robotic device 100 operates. The control system 140 could be located on the robotic device 100 or could be in remote communication with the robotic device 100. In one particular example, the sensing system 130 may use one or more body-mounted sensors 110 attached to the body 102 of the robotic device 100, which may be 2D sensors and/or 3D depth sensors that sense information about the environment as the robotic device 100 moves. For example, the body-mounted sensors 110 may determine a distance between the body 102 of the robotic device 100 and the ground surface on which the robotic device 100 operates. In further examples, one or more robotic leg sensors 112 may be located on the robotic legs 104 of the robotic device 100. The robotic leg sensors 112 may be contact sensors configured to alert the robotic device when the robotic legs 104 are in contact with the ground surface. In another example, the robotic legs 104 may be coupled to robotic feet 106 that contact the ground surface. In such a case, the robotic device 100 may include one or more robotic feet sensors 114 positioned on the robotic feet 106 of the robotic device 100. The robotic feet sensors 114 may be contact sensors configured to alert the robotic device 100 when the robotic feet 106 are in contact with the ground surface. The information from the robotic legs sensors 112 and/or the robotic feet sensors 114 may be used to estimate a ground plane of the ground surface on which the robotic device 100 operates, as discussed in more detail below.

The sensing system 130 may further include an IMU 116. In an illustrative embodiment, IMU 116 may include both a set of accelerometers and a gyroscope, which may be used together to determine the orientation, position, and/or velocity of the robotic device 100. In particular, the accelerometer can measure the orientation of the robotic device 100 with respect to gravity, while the gyroscope measures the rate of rotation around an axis. IMUs are commercially available in low-cost, low-power packages. For instance, an IMU 116 may take the form of or include a miniaturized MicroElectroMechanical System (MEMS) or a NanoElectroMechanical System (NEMS). Other types of IMUs may also be utilized.

An IMU 116 may include other sensors, in addition to accelerometers and gyroscopes, which may help to better determine position and/or help to increase autonomy of the robotic device 100. Two examples of such sensors are magnetometers and pressure sensors. Other examples are also possible.

The sensing system 130 may also include a non-contact sensor system 118 configured to determine virtual contact points in front of the robotic device 100. The virtual contact points may represent an estimation of a future contact point based on a current position and current velocity of the robotic device 100. In one example, the non-contact sensor system 118 may include a RADAR unit that utilizes radio signals to determine the virtual contact points.

In another example, the non-contact sensor system 118 may include a laser rangefinder/LIDAR unit configure to determine virtual contact points using lasers. The laser rangefinder/LIDAR unit may include one or more laser sources, a laser scanner, and one or more detectors, among other system components. The laser rangefinder/LIDAR unit can be configured to operate in a coherent (e.g., using heterodyne detection) or an incoherent detection mode.

In yet another example, the non-contact sensor system 118 may include a vision system including one or more cameras mounted on the robotic device 100. An example camera can be a photo-sensitive instrument, such as a still camera, a video camera, etc., that is configured to capture a plurality of images of the environment of the robotic device 100. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the environment. To this end, the camera may use one or more range detecting techniques.

For example, the camera can provide range information by using a structured light technique in which the robotic device 100 illuminates an object in the environment with a predetermined light pattern, such as a grid or checkerboard pattern and uses the camera to detect a reflection of the predetermined light pattern from environmental surroundings. Based on distortions in the reflected light pattern, the robotic device can determine the distance to the points on the object. The predetermined light pattern may comprise infrared light, or radiation at other suitable wavelengths for such measurements.

Many or all of the functions of the robotic device 100 could be controlled by control system 140. Control system 140 may include at least one processor 120 (which could include at least one microprocessor) that executes instructions 122 stored in a non-transitory computer readable medium, such as the memory 124. The control system 140 may also represent a plurality of computing devices that may serve to control individual components or subsystems of the robotic device 100 in a distributed fashion.

In some embodiments, memory 124 may contain instructions 122 (e.g., program logic) executable by the processor 120 to execute various functions of robotic device 100, including those described below in relation to FIG. 2. Memory 124 may contain additional instructions as well, including instructions to transmit data to, receive data from, interact with, and/or control one or more of the mechanical system 120, the sensor system 130, and/or the control system 140.

Figure 2:
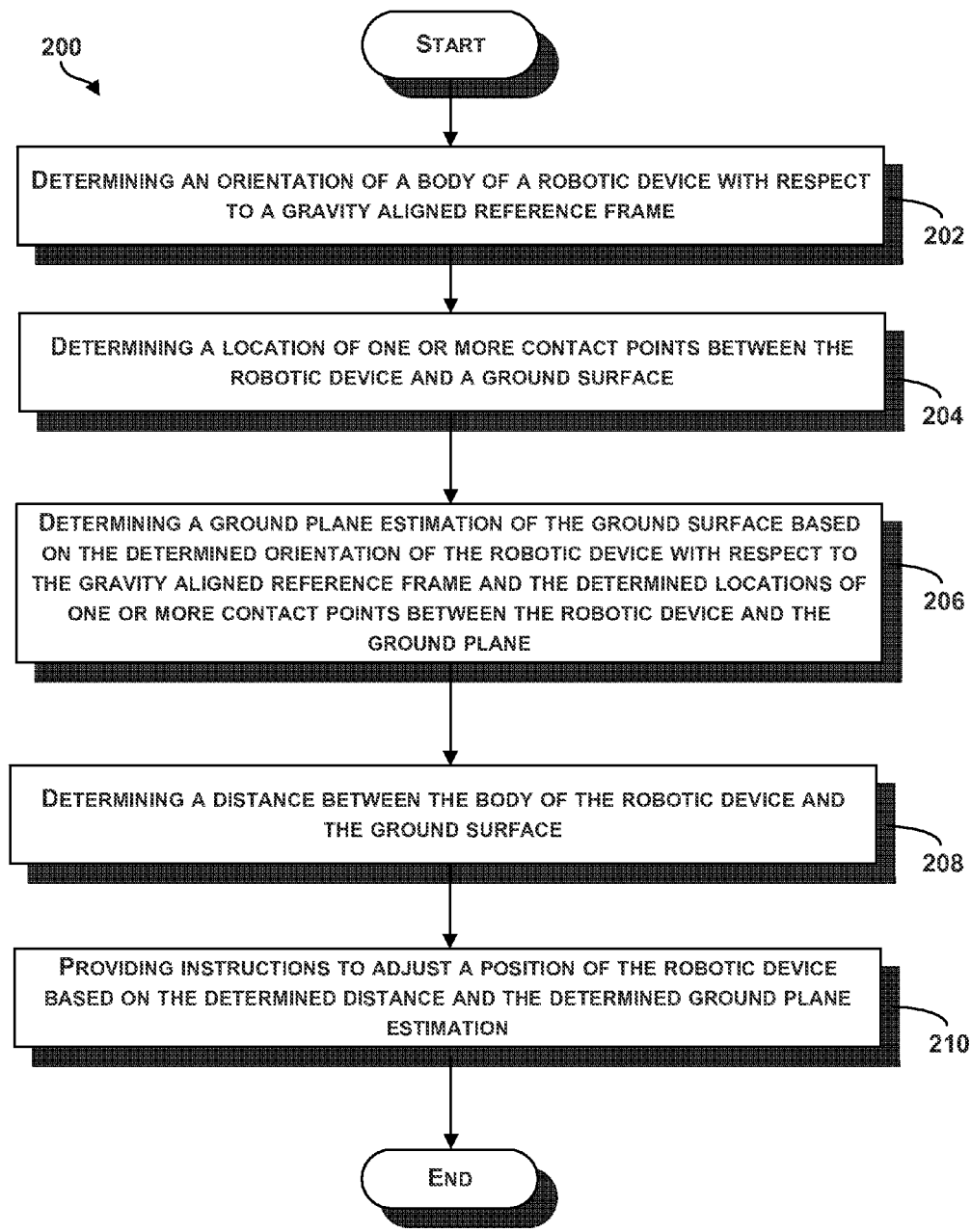
FIG. 2 is a flowchart illustrating an example method.

FIG. 2 is a flow chart of an example method for determining a ground plane estimation of a ground surface on which a robotic device operates, in accordance with at least some embodiments described herein. Method 200 shown in FIG. 2 presents an embodiment of a method that, for example, could be used with the systems shown in FIG. 1, for example, or may be performed by a combination of any components of in FIG. 1. Method 200 may include one or more operations, functions, or actions as illustrated by one or more of blocks 202-210. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 200 and other processes and methods disclosed herein, each block in FIG. 2 may represent circuitry that is wired to perform the specific logical functions in the process.

Functions of the method 200 may be fully performed by a computing device, or may be distributed across multiple computing devices and/or a server. The computing device may be incorporated into a robotic device, or the computing device may be an independent component in wireless communication with the robotic device. In some examples, the computing device may receive information from sensors or other components coupled to the computing device, or where the computing device is a server the information can be received from another device that collects the information. The computing device could further communicate with a server to determine information that may facilitate the performance of the method 200.

Referring again to FIG. 2, at block 202, the method 200 includes determining an orientation of a body of a robotic device with respect to a gravity aligned reference frame. The gravity aligned reference frame may be a fixed reference frame that is normally aligned with the gravity vector. As discussed above in relation to FIG. 1, the robotic device may include a sensing system including an IMU. The IMU may include accelerometers and a gyroscope, as examples. The IMU may be configured to output data for determining the orientation of the robotic device. One or more processors of the robotic device may receive the data from the IMU, and make a determination of the current orientation of the robotic device. The IMU may detect the current rate of acceleration using one or more accelerometers, and may further detect changes in rotational attributes like pitch, roll, and yaw using one or more gyroscopes.

At block 204, the method 200 includes determining the location of one or more contact points between the robotic device and the ground surface. In one example, contact points are discrete points in three-dimensional space that the robotic device, or control system of the robotic device, has computed and determined are likely on the ground. A determination of whether a point is on the ground can be based on sensor information and/or the context of the state of the robot controller. As discussed above in relation to FIG. 1, the robotic device may include one or more legs used to support a body. A bottom surface of the one or more legs may include sensors configured to indicate when the legs are touching the ground surface. In another example, one or more feet may be coupled to the one or more legs of the robotic device. In such an example, the one or more feet may include sensors configured to indicate when the feet are touching the ground surface.

Each of the one or more feet may have one or more sensors, designed to indicate a given set of contact points.

Further, contact points may be current (a latest value computed) or historical (computed based on a past measurements). Current contact points include information from one or more sensors located on the one or more feet and/or legs of the robotic device, as discussed above. Historical contact points include contact points stored in the memory or data storage of the robotic device, that may be used when the robotic device cannot compute current contact points, or an insufficient number of current contact points are available to calculate a ground plane estimation. In order to use historical points, the robotic device may keep track of a distance the robotic device has moved since the contact point was previously determined. The robotic device may then use the distance traveled to determine whether he previously determined contact point may be used for a current ground plane estimation. For example, if the distance traveled since the contact point was determined exceeds a threshold distance, the robotic device may discard the contact point as irrelevant. However, if the distance traveled since the contact point was determined does not exceed the threshold distance, the contact point may still be relevant to estimate the ground plane of the ground surface on which the robotic device operates.

In another example, contact points may be computed using joint positions and the determined orientation of the robotic device. For example, the robotic device may be geometrically calibrated. For example, the robotic device may have one or more legs, including one or more knee joints and one or more feet. Each of the components may have known geometric features, such as length, width and height, that are stored in the memory or data storage of the robotic device. Thus, the robotic device may determine contact points based on the determined orientation of the robotic device and the known position of the components of the robotic device.

In another example, contact points may be virtual points, generated based on a non-contact sensor system, such as a stereo vision system and/or laser rangefinder/LIDAR, as discussed above in relation to FIG. 1. The stereo vision system and/or or laser rangefinder/LIDAR system may be configured to detect a ground surface in front of the robotic device. For example, the non-contact sensor system may be configured to detect a ground surface approximately two meters from the robotic device. Virtual contact points represent an estimation of a future contact point based on a current position and current velocity of the robotic device. Virtual contact points may provide advanced notice about terrain the robotic device has not physically contacted yet.

Further, the contact points may include a combination of contact points from the one or more sensors and virtual contact points from the non-contact sensor system. For example, the robotic device may solely use contact points from the one or more sensors if there are three or more contact points. However, if there are less than three contact points from the one or more sensors, the robotic device may use virtual contact points from the non-contact sensor system. As another example, the robotic device may use virtual contact points if the robotic device is traveling at a velocity that exceeds a threshold velocity. In such a case, it may be particularly advantageous to provide advanced notice about terrain the robotic device has not physically contacted yet. Other examples are possible as well.

In yet another example, the contact points may be weighted to represent the relative confidence of each of the determined contact points. The processor of the computing device may determine a weight coefficient for a given contact point based on a number of factors. For example, current contact points from the one or more sensors of the robotic device may be weighted more heavily than historical contact points or virtual contact points. As another example, historical contact points may be weighted based on the amount of time that has elapsed since the contact point was originally determined. In such an example, the longer the amount of time, the lower the weight coefficient. In a case where four or more contact points are detected, the robotic device may use the contact point weights in an optimization when estimating the ground plane of the ground surface. Other examples are possible as well.

Given a set of contact points, a subset of those contact points may be filtered out of the ground plane estimation calculation. For example, a spatial filter may remove contact points that are outside of a target region surround the robotic device's current position. As another example, historical contact points may be removed after a given time period to reduce error resulting from odometry drift.

In certain configurations, the robotic device control software may provide suggestions to condition the ground plane estimation. Some examples include contact point grouping, and reduced order output. Contact point grouping enables a collection of points to be averaged and treated as a single point. In certain cases, two or more contact points that are too close together will likely provide excessively noisy additional information for certain dimensions of a ground plane fit. One method to suppress this noise is to group these too-close contact points into a single, representative contact point, which itself provides all the salient (i.e. useable) geometric information, in a predictable way, for any subsequent ground plane estimation. As a particular example, the robotic device may group contact points to reduce the total number of contact points from four to three, in the event that two of the points are sufficiently close together. Other examples are possible as well.

At block 206, the method 200 includes determining a ground plane estimation of the ground surface based on the determined orientation of the robotic device with respect to gravity aligned reference frame and the determined location of the one or more contact points between the robotic device and the ground surface. The ground plane estimation is a flat-plane approximation of a shape of the ground surface. In particular, one or more processors of the computing device may receive information indicating the orientation of the body of the robotic device, as well as the information indicating the one or more contact points. The one or more processors of the robotic device may subsequently use the received information to estimate a ground plane on which the robotic device operates.

The ground plane calculation may use any number of discrete contact points. When less than three contact points are available, the ground plane may be considered under-constrained. When there are exactly three non-collinear points the ground plane may be fully constrained. Further, when more than three non-collinear points are available, the ground plane may be considered over-constrained and optimization is used. Each of these cases is discussed in more detail below.

In one example, the robotic device may detect zero contact points between the robotic device and the ground surface. In such an example, the ground plane estimation may simply be the last ground plane determined by the robotic device. The robotic device may store previously determined ground plane estimations in its memory, for example. In one example, the robotic device may only store the previous ten ground plane estimations. When no contact points are available in a current position, the robotic device may make an assumption that the ground plane has not changed drastically since the last estimation, and may use the previous ground plane as an estimate for a current situation.

In another example, the robotic device may detect one contact point between the robotic device and the ground surface. In such an example, the robotic device may determine the ground plane estimation of the ground surface by determining a plane including the one contact point that is parallel to the previously determined ground plane. Further, the position and orientation of the robotic device are used to compute the position and orientation of the ground plane relative to the robotic device.

In another example, the robotic device may detect two contact points between the robotic device and the ground surface. In such an example, the robotic device may determine a normal vector of a previously determined ground plane estimation. The normal vector is defined as the vector perpendicular to the previously determined ground plane estimation. The robotic device may subsequently project the normal vector of the previously determined ground plane estimation to be perpendicular to a line connecting the two contact points, such that the projected normal vector is perpendicular to the new ground plane estimation.

In another example, the robotic device may detect three contact points between the robotic device and the ground surface. In such an example, the robotic device may determine the ground plane estimation by determining a plane including each of the three contact points.

In yet another example, the robotic device may detect four or more contact points between the robotic device and the ground surface. In such an example, the robotic device may determine a ground plane that minimizes the square distance between each of the four or more contact points and the ground plane. In another example, the square distance between each contact point and the desired ground plane may be weighted as discussed above. Other examples are possible as well.

Signal processing may be employed to condition the ground plane estimation. For example, a low pass filter may be used to remove high-frequency content from the ground plane estimate. Further, the robotic device may determine a confidence score based on how well contact points fit the ground plane estimate. For example, if the determined locations of the contact points are close to being in a line, the robotic device may determine that the resulting ground plane estimation has a low confidence score. In another example, if the determined locations of the contact points are spread out, the robotic device may determine that the resulting ground plane estimation has a high confidence score. In cases where the ground plane estimate is below a threshold confidence score, the robotic device may freeze the ground plane estimate at a past estimate with a higher confidence score.

At block 208, the method 200 includes determining a distance between the body of the robotic device and the determined ground plane estimation. In one example, the robotic device may determine the distance based on information from one or more sensors on the body of the robotic device. In another example, the robotic device may determine the distance based on the determined orientation of the body of the robotic device and a position of one or more legs of the robotic device. In such an example, the robotic device may include stored information including the geometric properties of the one or more legs of the robotic device. The robotic device may then determine the distance based on the determined orientation of the body of the robotic device and the known geometric properties of the one or more legs. In yet another example, the robotic device may further include current joint angle information for the one or more legs. In such an example, the robotic device may determine the distance based on the determined joint angle and the known geometric properties of the one or more legs. The distance between the body of the robotic device and the determined ground plane estimation may represent a height of the robotic device with respect to the ground plane.

In another example, determining the distance between the body of the robotic device and the determined ground plane estimation may include determining an average distance. For example, the robotic device may determine a first distance between the body of the robotic device and a first point on the determined ground plane estimation, and further determine a second distance between the body of the robotic device and a second point on the determined ground plane estimation. The robotic device may then average the first distance and the second distance to determine the distance between the body of the robotic device and the determined ground plane estimation. Other examples are possible as well.

At block 210, the method 200 includes providing instructions to adjust a position of the robotic device based on the determined distance and the determined ground plane estimation. In one example, one or more processors of the robotic device may provide instructions to position one or more legs of the robotic device such that a center of gravity projection of the robotic device is located within a polygon defined by the one or more legs of the robotic device. In another example, one or more processors of the robotic device may provide instructions to swing one or more feet of the robotic device parallel to the determined ground plane estimation to provide consistent ground clearance. In yet another example, one or more processors of the robotic device may provide instructions to orient one or more features of the body of the robotic device substantially parallel to the determined ground plane estimation, or at some other orientation relative to the ground plane estimation.

In another example, the robotic device may further determine an orientation difference between the body of the robotic device and the determined ground plane estimation. The orientation difference may compare a current orientation of the body of the robotic device with respect to the gravity aligned reference frame, and the determined ground plane estimation. In such a case, the robotic device may provide instructions to adjust the position of the robotic device based on the determined distance, the determined orientation difference, and the determined ground plane estimation. Other examples are possible as well.

According to various embodiments, a ground plane estimation system is described. For instance, a robotic device may utilize a combination of a determined orientation of the robotic device and one or more contact points between the robotic device and a ground surface to determine a flat-plane approximation of the ground surface on which the robotic device operates. FIGS. 3A-3D illustrate the robotic device determining a ground plane estimation, according to an example embodiments.

Figure 3B:
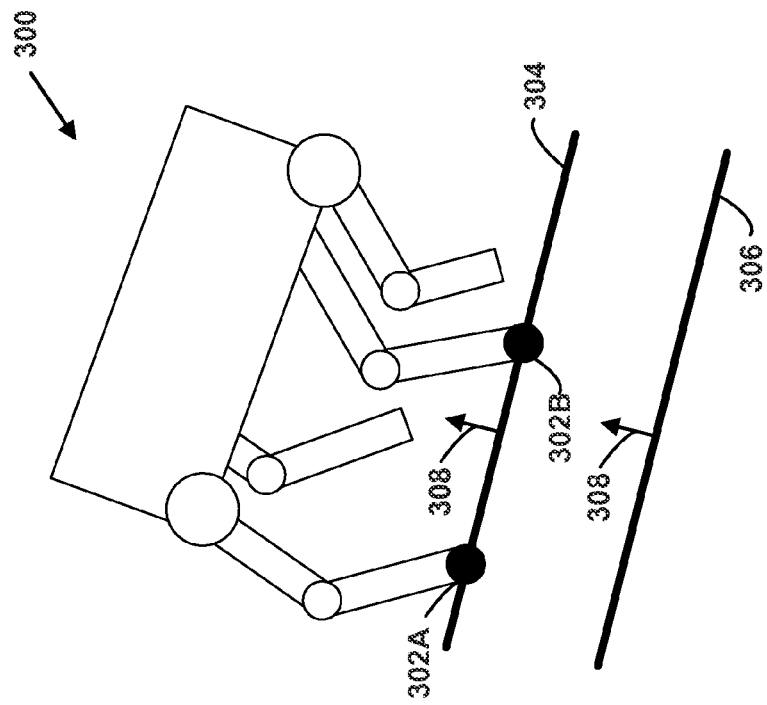
FIGS. 3A-3D illustrate an example system configured to perform functions of the example method, in accordance with at least some embodiments described herein.
Figure 3A:
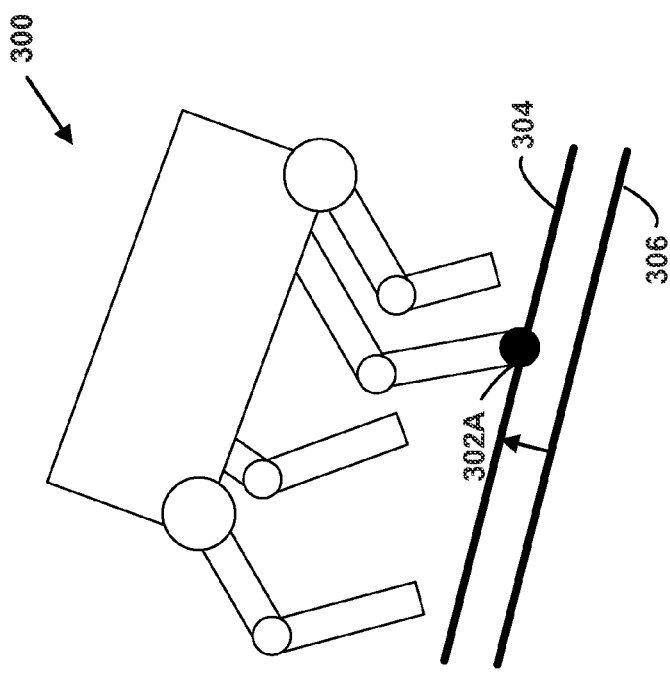

FIG. 3A illustrates an example embodiment when the robotic device 300 detects one contact point 302A between the robotic device 300 and the ground surface. As discussed above, the robotic device 300 may determine the ground plane estimation 304 of the ground surface by determining a plane including the one contact point that is parallel to the previously determined ground plane 306.

FIG. 3B illustrates an example embodiment when the robotic device 300 detects two contact points 302A, 302B between the robotic device 300 and the ground surface. As discussed above, the robotic device 300 may determine a normal vector 308 of a previously determined ground plane estimation 306. The robotic device 300 may subsequently project the normal vector 308 of the previously determined ground plane estimation 306 to be perpendicular to a line connecting the two contact points 302A, 302B, such that the projected normal vector 308 is perpendicular to the ground plane estimation 304.

Figure 3D:
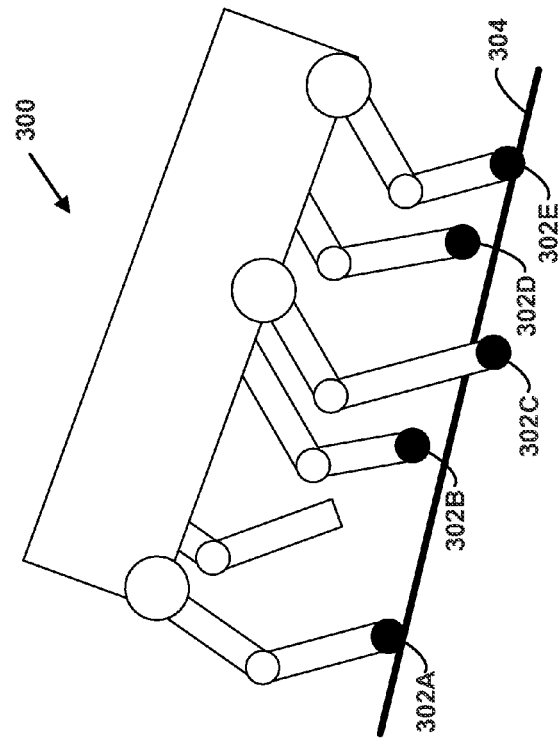
Figure 3C:
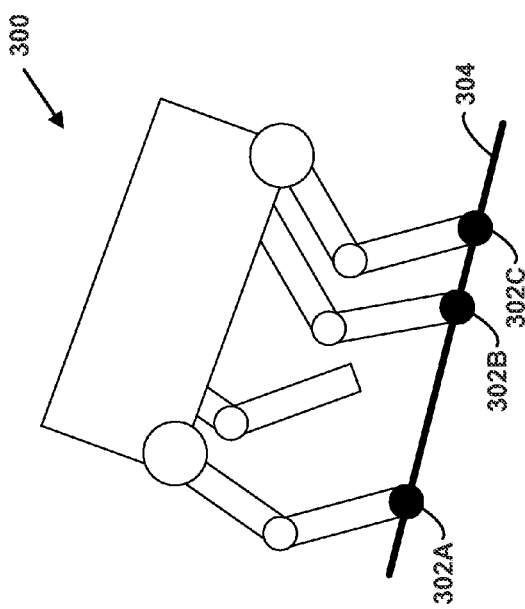

FIG. 3C illustrates an example embodiment when the robotic device 300 detects three contact points 302A-302C between the robotic device 300 and the ground surface. As discussed above, the robotic device 300 may determine the ground plane estimation 304 by determining a plane including each of the three contact points 302A, 302B, and 302C.

FIG. 3D illustrates an example embodiment when the robotic device 300 detects five contact points 302A-302E between the robotic device 300 and the ground surface. As discussed above, in such a case the robotic device 300 may determine a ground plane that minimizes the sum of the square distance between each of the five contact points 302A-302E and the ground plane.

Figure 4:
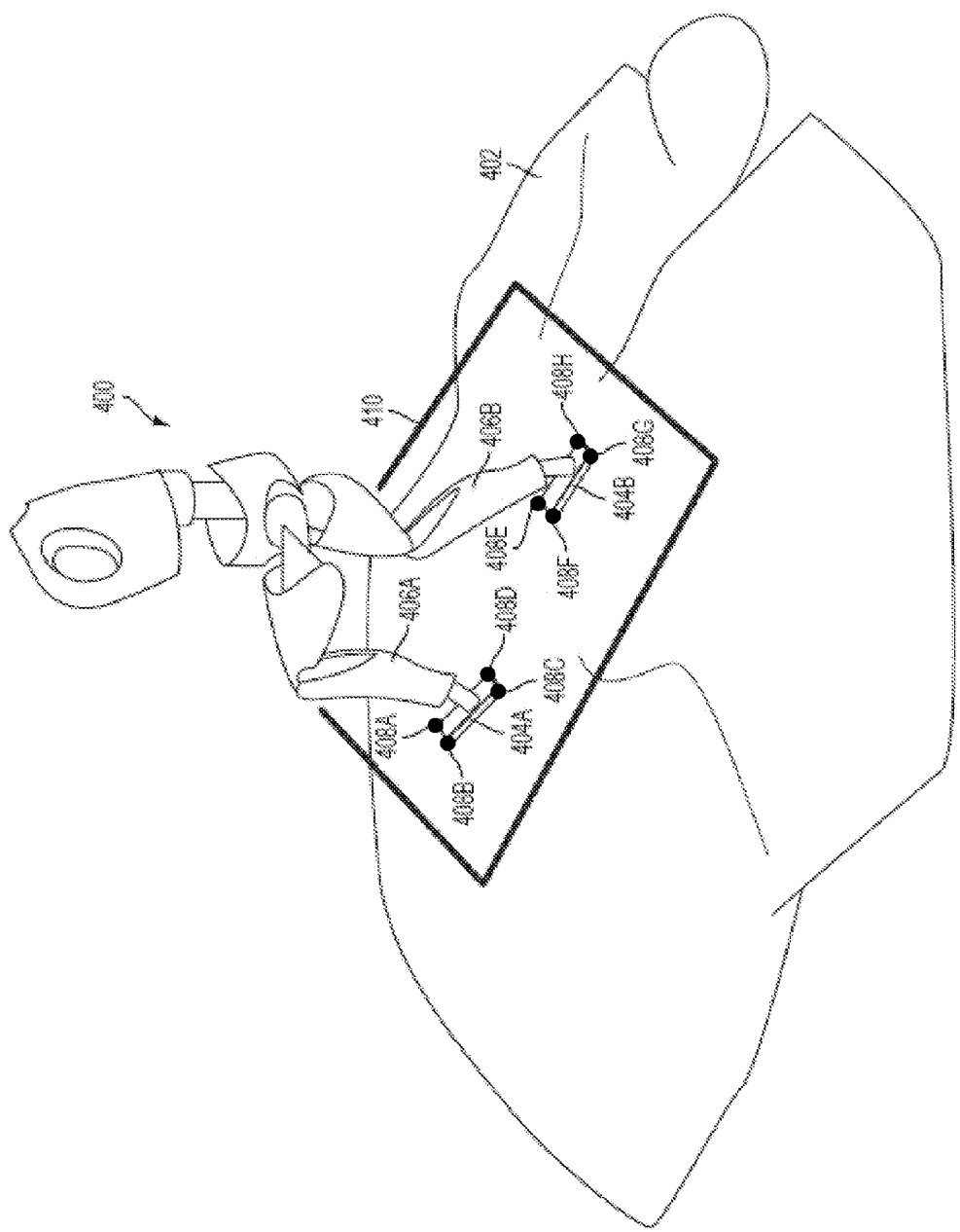
FIG. 4 illustrate another example system configured to perform functions of the example method, in accordance with at least some embodiments described herein.

FIG. 4 illustrates another example robotic device 400 configured to perform functions of the example method, in accordance with at least some embodiments described herein. In particular, FIG. 4 illustrates an example bipedal robotic device 400 navigating over a rocky terrain 402. The robotic device 400 includes two feet 404A, 404B coupled to two legs 406A, 406B. Each of the feet 404A, 404B include four contact points 408A-408H. The contact points 408A-408H may be used to estimate a ground plane 410, using the methods described above. In the particular example shown in FIG. 4, the robotic device 400 is shown having eight contact points 408A-408H with the ground surface 402. As discussed above, in such a case the robotic device 400 may determine a square distance between the eight contact points 408A-408H, and may subsequently determine a ground plane 410 that minimizes the square distance between the eight contact points 408A-408H. Other examples for estimating the ground plane are possible as well, as discussed above.

Figure 5:
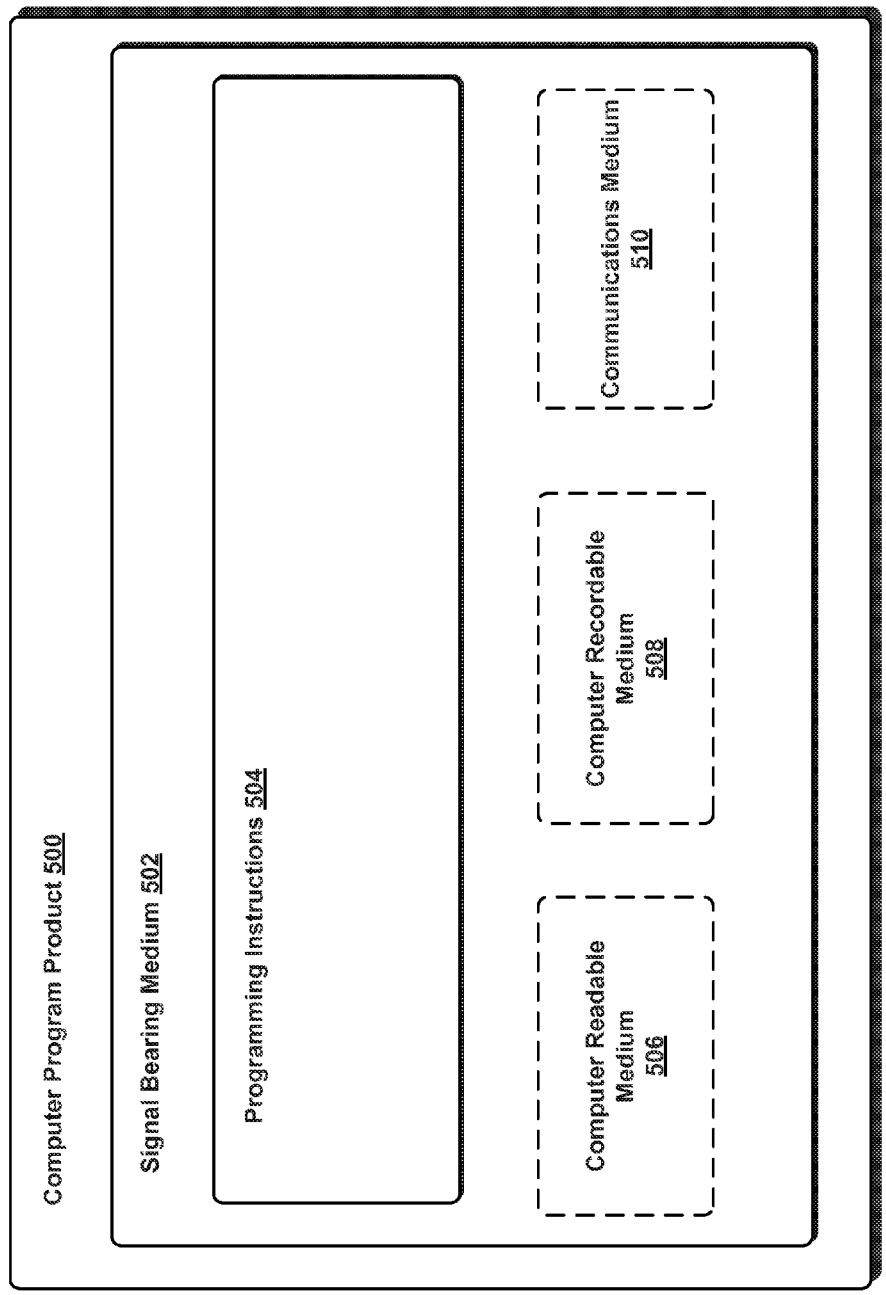
FIG. 5 depicts a computer-readable medium configured according to an example embodiment.

FIG. 5 illustrates a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

As noted above, in some embodiments, the disclosed methods can be implemented by computer program instructions encoded on a non-transitory computer-readable storage media in a machine-readable format, or on other non-transitory media or articles of manufacture. FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 may include one or more programming instructions 504 that, when executed by one or more processors may provide functionality or portions of the functionality described above with respect to FIGS. 1-4. In some examples, the signal bearing medium 502 can be a computer-readable medium 506, such as, but not limited to, a hard disk drive, a Compact Disc (CD), a Digital Video Disk (DVD), a digital tape, memory, etc. In some implementations, the signal bearing medium 502 can be a computer recordable medium 508, such as, but not limited to, memory, read/write (R/W) CDs, R/W DVDs, etc. In some implementations, the signal bearing medium 502 can be a communications medium 510, such as, but not limited to, a digital and/or an analog communication medium (e.g., a fiber optic cable, a waveguide, a wired communications link, a wireless communication link, etc.). Thus, for example, the signal bearing medium 502 can be conveyed by a wireless form of the communications medium 510.

The one or more programming instructions 504 can be, for example, computer executable and/or logic implemented instructions. In some examples, a computing device such as the processor 120 of FIG. 1 is configured to provide various operations, functions, or actions in response to the programming instructions 504 conveyed to the processor 120 by one or more of the computer-readable medium 506, the computer recordable medium 508, and/or the communications medium 510.

The non-transitory computer-readable medium could also be distributed among multiple data storage elements, which could be remotely located from each other. The device that executes some or all of the stored instructions could be a client-side computing device. Alternatively, the device that executes some or all of the stored instructions could be a server-side computing device.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method operable by a computing device, the method comprising:

determining an orientation of a body of a robotic device with respect to a gravity aligned reference frame;

determining a location of one or more contact points between the robotic device and a ground surface;

determining, by one or more processors of the computing device, a ground plane estimation of the ground surface based on the determined orientation of the robotic device with respect to the gravity aligned reference frame and the determined locations of the one or more contact points between the robotic device and the ground surface, wherein the ground plane estimation includes a flat-plane approximation of a shape of the ground surface that minimizes a distance between the one or more contact points and the determined ground plane estimation; and determining a distance between the body of the robotic device and the determined ground plane estimation; and providing instructions, by the one or more processors, to adjust a position of the robotic device based on the determined distance and the determined ground plane estimation.

2. The method of claim 1, wherein the robotic device includes an inertial measurement unit (IMU) including an accelerometer and a gyroscope, and wherein the IMU outputs data for determining the orientation of the robotic device with respect to the gravity aligned reference frame.

3. The method of claim 1, wherein the location of one or more contact points between the robotic device and the ground surface are determined based on one or more sensors positioned on one or more legs of the robotic device.

4. The method of claim 3, wherein providing instructions to adjust the position of the robotic device based on the determined ground plane estimation comprises providing instructions to position the one or more legs of the robotic device such that a center of mass of the robotic device is located within a polygon defined by the one or more legs of the robotic device.

5. The method of claim 1, wherein the location of one or more contact points between the robotic device and the ground surface are determined based on one or more sensors positioned on one or more feet of the robotic device.

6. The method of claim 5, wherein providing instructions to adjust the position of the robotic device based on the determined distance and the determined ground plane estimation comprises providing instructions to swing one or more feet of the robotic device substantially parallel to the determined ground plane estimation to provide consistent ground clearance.

7. The method of claim 1, wherein providing instructions to adjust the position of the robotic device based on the determined distance and the determined ground plane estimation comprises providing instructions to orient one or more features of the body of the robotic device substantially parallel to the determined ground plane estimation, or at some orientation relative to the determined ground plane.

8. The method of claim 1, further comprising:
determining one or more virtual contact points in the vicinity of the robotic device, wherein the one or more virtual contact points represent an estimation of a future, current, or past contact point based on a current position and a current velocity of the robotic device, wherein the virtual contact points are determined via a non-contact sensor system, and wherein the determined ground plane estimation of the ground surface is further based on the determined one or more virtual contact points.

9. The method of claim 8, wherein the non-contact sensor system comprises a vision system.

10. The method of claim 8, wherein the non-contact sensor system comprises a laser range finder.

11. The method of claim 1, wherein two contact points are determined between the robotic device and the ground surface, and wherein determining the ground plane estimation of the ground surface comprises:
determining a normal vector of a previously determined ground plane estimation; and
projecting the normal vector of the previously determined ground plane estimation to be perpendicular to a line connecting the two contact points, such that the projected normal vector is perpendicular to the determined ground plane estimation.

12. The method of claim 1, wherein three contact points are determined between the robotic device and the ground surface, and wherein determining the ground plane estimation of the ground surface comprises:
determining a plane including the three contact points.

13. The method of claim 1, wherein determining a distance between the body of the robotic device and the determined ground plane estimation comprises:
determining a first distance between the body of the robotic device and a first point on the determined ground plane estimation;
determining a second distance between the body of the robotic device and a second point on the determined ground plane estimation; and
averaging the first distance and the second distance.

14. The method of claim 1, further comprising:
determining an orientation difference between the body of the robotic device and the determined ground plane estimation; and
providing instructions, by the one or more processors, to adjust the position of the robotic device based on the determined distance, the determined orientation difference, and the determined ground plane estimation.

15. A robotic device including:
a body;
two or more legs extending from the body;
at least one processor; and
data storage comprising program logic executable by the at least one processor to cause the robotic device to perform functions comprising:
determining an orientation of the body of the robotic device with respect a gravity aligned reference frame;
determining a location of one or more contact points between the robotic device and a ground surface;
determining a ground plane estimation of the ground surface based on the determined orientation of the robotic device with respect to the gravity aligned reference frame and the determined locations of the one or more contact points between the robotic device and the ground surface, wherein the ground plane estimation includes a flat-plane approximation of a shape of the ground surface that minimizes a distance between the one or more contact points and the determined ground plane estimation;
determining a distance between the body of the robotic device and the determined ground plane estimation; and
providing instructions to adjust a position of the robotic device based on the determined distance and the determined ground plane estimation.

16. The robotic device of claim 15, wherein the robotic device includes an inertial measurement unit (IMU) including an accelerometer and a gyroscope, and wherein the IMU outputs data for determining the orientation of the robotic device with respect to the gravity aligned reference frame.

17. The robotic device of claim 15, wherein the one or more contact points between the robotic device and the ground surface comprise a location of one or more sensors positioned on two or more legs of the robotic device.

18. The robotic device of claim 15, further comprising two or more feet coupled to the two or more legs, wherein the one or more contact points between the robotic device and the ground surface, the position of which are determined by one or more sensors on the robotic device.

19. A non-transitory computer-readable storage medium having stored thereon instructions, that when executed by a computing device, cause the computing device to carry out functions comprising:
determining an orientation of a body of a robotic device with respect to a gravity aligned reference frame;

determining a location of one or more contact points between the robotic device and a ground surface;

determining a ground plane estimation of the ground surface based on the determined orientation of the robotic device with respect to the gravity aligned reference frame and the determined locations of the one or more contact points between the robotic device and the ground surface, wherein the ground plane estimation includes a flat-plane approximation of a shape of the ground surface that minimizes a distance between the one or more contact points and the determined ground plane estimation;

determining a distance between the body of the robotic device and the determined ground plane estimation; and providing instructions to adjust a position of the robotic device based on the determined distance and the determined ground plane estimation.

20. The non-transitory computer-readable storage medium of claim 19, wherein the functions further comprise:

determining one or more virtual contact points in the vicinity of the robotic device, wherein the one or more virtual contact points represent an estimation of a future, current, or past contact point based on a current position and a current velocity of the robotic device, wherein the virtual contact points are determined via a non-contact sensor system, and wherein the ground plane estimation of the ground surface is further based on the determined one or more virtual contact points.

21. The non-transitory computer-readable storage medium of claim 19, wherein providing instructions to adjust the position of the robotic device based on the determined distance and the determined ground plane estimation comprises providing instructions to position a bottom surface of the body of the robotic device substantially parallel to the determined ground plane estimation.

* * * * *